(12) United States Patent
Hikida (10) Patent No.: US 8,930,809 B2
(45) Date of Patent: Jan. 6, 2015

(54) EDITING APPARATUS AND LAYOUT METHOD, AND STORAGE MEDIUM

(75) Inventor: Ayako Hikida, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 777 days.

(21) Appl. No.: 12/766,491

(22) Filed: Apr. 23, 2010

(65) Prior Publication Data

US 2010/0313107 A1 Dec. 9, 2010

(30) Foreign Application Priority Data

Jun. 3, 2009 (JP) ................................. 2009-134295

(51) Int. Cl.
- *G06F 17/00* (2006.01)
- *G06F 17/21* (2006.01)
- *G06T 11/60* (2006.01)
- *G06F 17/24* (2006.01)

(52) U.S. Cl.
CPC .............. *G06F 17/212* (2013.01); *G06T 11/60* (2013.01); *G06F 17/24* (2013.01); *G06F 17/21* (2013.01)
USPC ........... 715/243; 715/204; 715/255; 715/256; 715/273

(58) Field of Classification Search
CPC ........ G06F 17/21; G06F 17/212; G06F 17/24
USPC ................. 715/200–202, 204, 243, 234, 247, 715/255–256, 273
See application file for complete search history.

(56) References Cited

U.S. PATENT DOCUMENTS

| | | | | |
|---|---|---|---|---|
| 6,173,286 B1* | 1/2001 | Guttman et al. | ............... | 715/234 |
| 6,256,650 B1* | 7/2001 | Cedar et al. | .................. | 715/235 |
| 6,469,717 B1* | 10/2002 | Wineke et al. | ................ | 715/788 |
| 7,430,713 B2* | 9/2008 | Kobashi et al. | ............... | 715/244 |
| 7,581,178 B2* | 8/2009 | Hays et al. | .................... | 715/243 |
| 7,831,579 B2* | 11/2010 | Wade et al. | ................... | 707/705 |
| 8,090,719 B2* | 1/2012 | Wade et al. | .................... | 707/736 |
| 8,533,628 B2* | 9/2013 | Rohrabaugh et al. | ......... | 715/815 |
| 2006/0026512 A1* | 2/2006 | Hays et al. | .................... | 715/525 |
| 2006/0117255 A1* | 6/2006 | Seeler | ............................ | 715/520 |
| 2007/0083811 A1* | 4/2007 | Matsuo et al. | ................ | 715/530 |
| 2007/0113175 A1* | 5/2007 | Iwasaki | ......................... | 715/517 |
| 2008/0180457 A1* | 7/2008 | Yamazaki | ..................... | 345/619 |
| 2008/0189603 A1* | 8/2008 | Kikuchi | ........................ | 715/243 |
| 2009/0327872 A1* | 12/2009 | Kamiyama et al. | ........... | 715/243 |
| 2010/0100811 A1* | 4/2010 | Ishiguro | ........................ | 715/243 |

FOREIGN PATENT DOCUMENTS

| | | |
|---|---|---|
| CN | 1607522 A | 4/2005 |
| CN | 1940845 A | 4/2007 |
| JP | 2007-036584 | 2/2007 |

* cited by examiner

*Primary Examiner* — Cesar Paula
*Assistant Examiner* — David Faber
(74) *Attorney, Agent, or Firm* — Cowan, Liebowitz & Latman, P.C.

(57) ABSTRACT

An apparatus for laying out image data and text data on a page, which distributes multiple sets of image data and text data into multiple sets of an image box and a text box upon a page in an order based on attribute information of the image data, compares the text data to an upper limit of the text box into which the text data has been distributed and when the text data is greater than the upper limit of the text box, switches the set of the image data and the text data with another set of distributed image data and text data into another set of an image box and a text box, the text data is less than the upper limit of the other text box, and the upper limit of the text box is greater than the other text data.

9 Claims, 8 Drawing Sheets

| IMAGE ID | COMMENTS | NUMBER OF LINES | NUMBER OF CHARACTERS (INCLUDING LINE BREAKS) | FRAME ID |
|---|---|---|---|---|
| 1 | ○○○○○○<br>□□××××× | 3 | 16 | F1 |
| 2 | △△△△△△△△ | 1 | 8 | F2 |
| 3 | ○○○○○○○○○○○○○○<br>△△△△△△△△△△△△△△△△△△<br>○○○○○ | 2 | 39 | F3 |
| 4 |  | 0 | 0 | F4 |
| 5 | □□□ | 1 | 3 | F5 |

| IMAGE ID | COMMENTS | NUMBER OF LINES | NUMBER OF CHARACTERS (INCLUDING LINE BREAKS) | FLAME ID |
|---|---|---|---|---|
| 1 | ○○○○○○<br>□□××××× | 3 | 16 | F2 |
| 2 | △△△△△△△△ | 1 | 8 | F1 |
| 3 | ○○○○○○○○○○○○○○<br>△△△△△△△△△△△△△△△△△△<br>○○○○○ | 2 | 39 | F3 |
| 4 |  | 0 | 0 | F4 |
| 5 | □□□ | 1 | 3 | F5 |

EDITING APPARATUS AND LAYOUT METHOD, AND STORAGE MEDIUM

BACKGROUND OF THE INVENTION

1. Field of the Invention

The present invention relates to editing techniques for laying out, upon a page, a combination of image data and text data associated with the image data.

2. Description of the Related Art

There are techniques for generating, for example, an electronic album by laying out image data, text data, and so on upon a page.

Conventionally, layouts upon pages have been set in accordance with the image data, and thus there have been cases where there is insufficient space for inserting text data (characters) associated with the image data, resulting in the user being unable to input the amount of text data (number of characters) that s/he desires. Meanwhile, unused space arises when only a low amount of text data is desired by the user. In order to avoid these problems, it is necessary for the user to repeat the task of inputting text after changing the layout of the image data, which is extremely cumbersome.

SUMMARY OF THE INVENTION

In order to solve the aforementioned problems, the present invention provides an editing apparatus for laying out image data and text data on a page, comprising: a distributing unit configured to distribute multiple sets of image data and text data into multiple sets of an image box and a text box upon a page in an order based on attribute information of the image data; a comparison unit configured to compare the amount of the text data to an upper limit amount of the text box into which the text data has been distributed; and a switching unit configured to, when the result of the comparison indicates that the amount of the text data is greater than the upper limit amount of the text box, switch the set of the image data and the text data with another set of image data and text data that has been distributed into another set of an image box and a text box, wherein the amount of the text data is less than the upper limit amount of the other text box, and the upper limit amount of the text box is greater than the amount of the other text data.

The present invention also provides an editing apparatus for laying out image data and text data on a page, comprising: a comparison unit configured to compare the amount of text data to a data upper limit amount of a text box upon a page; and a distributing unit configured to distribute the text data into a text box having a greater upper limit amount than the amount of the text data based on the result of the comparison, and distribute image data associated with the text data into an image box that forms a pair with the text box.

The present invention also provides a method of laying out image data and text data on a page, comprising the steps of: distributing multiple sets of image data and text data into multiple sets of an image box and a text box upon a page in an order based on attribute information of the image data; comparing the amount of the text data to an upper limit amount of the text box into which the text data has been distributed; and when the result of the comparison indicates that the amount of the text data is greater than the upper limit amount of the text box, switching the set of the image data and the text data with another set of image data and text data that has been distributed into another set of an image box and a text box, wherein the amount of the text data is less than the upper limit amount of the other text box, and the upper limit amount of the text box is greater than the amount of the other text data.

The present invention also provides a method of laying out image data and text data on a page, comprising the steps of: comparing the amount of text data to a data upper limit amount of a text box upon a page; and distributing the text data into a text box having a greater upper limit amount than the amount of the text data based on the result of the comparison, and distributing image data associated with the text data into an image box that forms a pair with the text box.

According to the present invention, when laying out, upon a page, image data and text data associated with the image data, an appropriate layout based on the amount of the text data can be created through a simple operation.

Further features of the present invention will become apparent from the following description of an exemplary embodiment (with reference to the attached drawings).

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

First Embodiment

Figure 1:
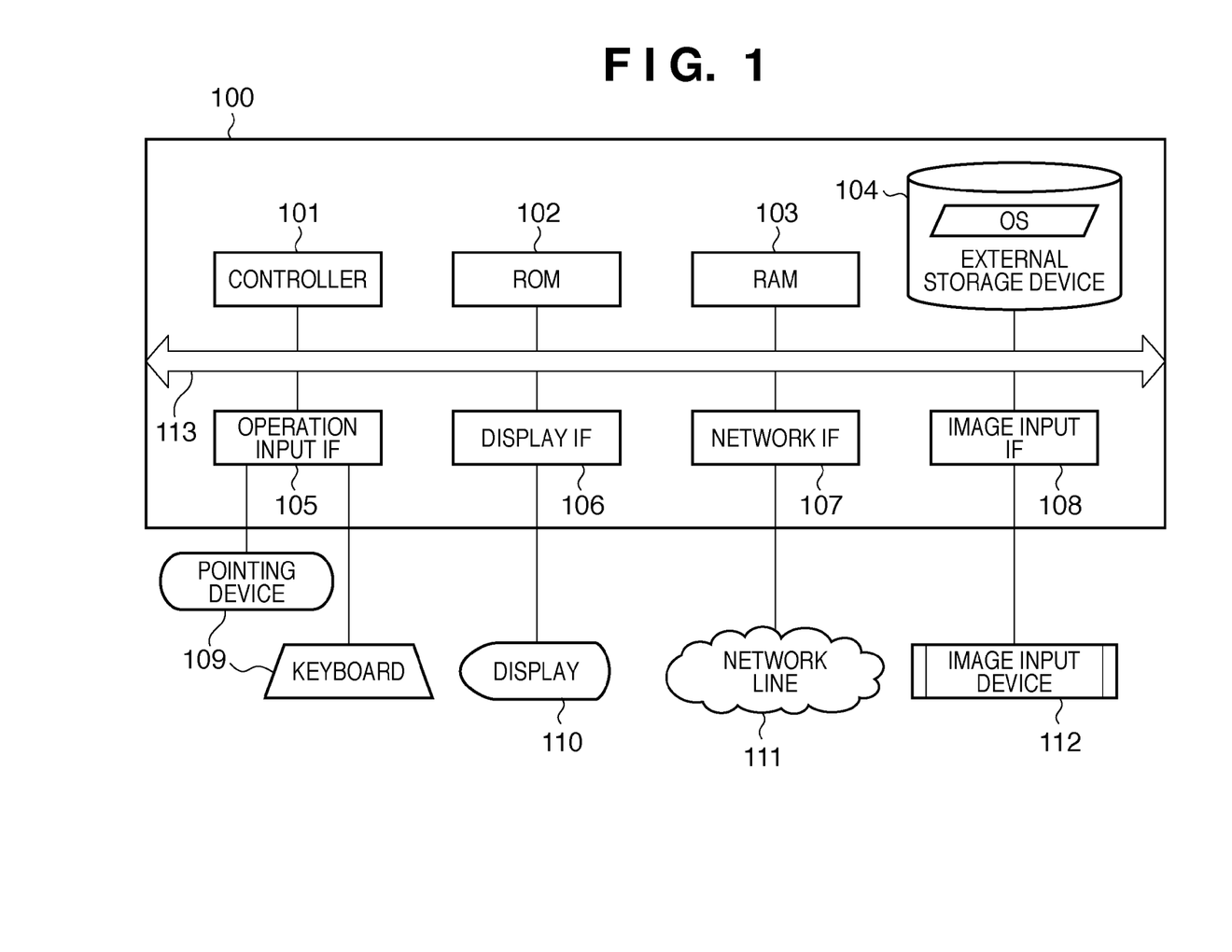
FIG. 1 is a block diagram illustrating the configuration of a page layout editing apparatus according to an embodiment of the invention.

First, the configuration of a page layout editing apparatus ("editing apparatus", hereinafter) 100 according to the present embodiment will be described with reference to FIG. 1. In FIG. 1, 101 indicates a controller that controls the editing apparatus 100 as a whole, and is, for example, a CPU (Central Processing Unit). Reference numeral 102 indicates a ROM (Read Only Memory) that stores various programs, parameters, and so on that do not require alterations. Reference numeral 103 indicates a RAM (Random Access Memory) that temporarily stores programs, data, and so on supplied from an external device or the like. Reference numeral 104 indicates an external storage device, which may be a hard disk, memory card, or the like installed within the editing apparatus 100, a Floppy® disk, an optical disk such as a compact disc (CD), or the like that is detachable from the editing apparatus 100, a magnetic or optical card, a smartcard, or the like. A computer OS, an electronic album generation application program (described later), and so on for operating as the editing apparatus 100 are stored in the external storage device 104. Reference numeral 105 indicates an operation input IF (interface) that receives operations from a user made using an input device 109 such as a pointing device, a keyboard, or the like for inputting data. Reference numeral 106 indicates a display IF for displaying data held by the editing apparatus 100, data supplied from an external device, and so on in a display 110. Reference numeral 107 is a network IF for connecting to a network line 111 such as the Internet or the like. Reference numeral 108 indicates an image input IF for inputting image data from an image input device 112 such as a digital camera or the like. Finally, reference numeral 113 is a system bus that connects the aforementioned elements 101 to 108 in a communicable state.

In the present embodiment, operations executed by the editing apparatus 100 are realized by the controller 101 reading out and launching the OS, electronic album generation application program, and so on from the external storage device 104, and controlling various types of modules. The external device is, for example, a server computer of an online shop that accepts orders from users over the network line 111 and creates electronic albums as books.

Figure 2:
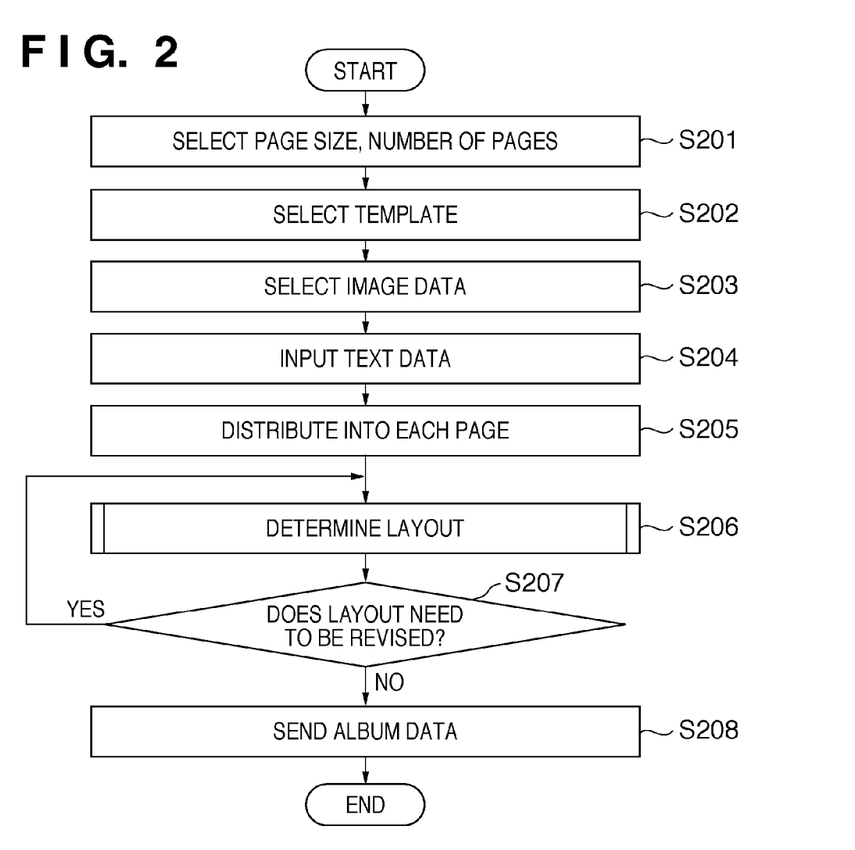
FIG. 2 is a flowchart illustrating a layout processing procedure according to an embodiment of the invention.
Figure 3:
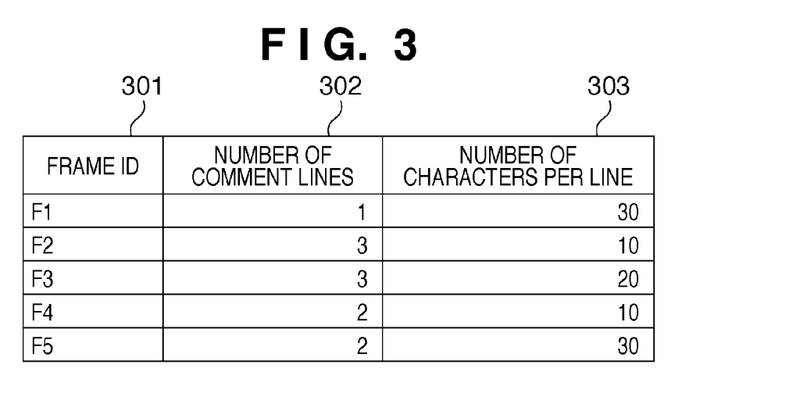
FIG. 3 is a diagram illustrating an example of an attributes table used in a layout determination process according to an embodiment of the invention.
Figure 4:
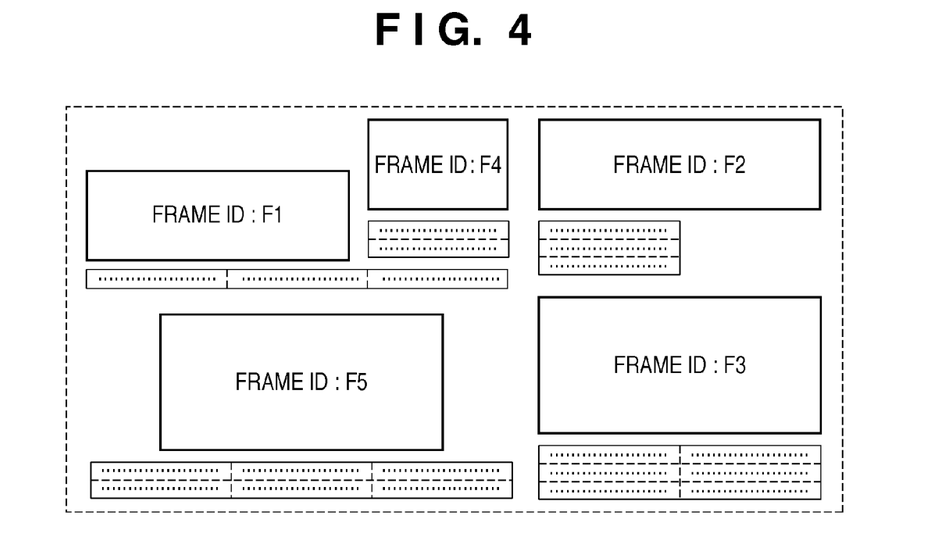
FIG. 4 is a diagram illustrating an example of a page layout of image boxes and text boxes corresponding to the example of the template illustrated in FIG. 3.

Next, a procedure for laying out, upon a page, a combination of image data and text data associated with the image data according to the present embodiment will be described with reference to FIG. 2. Here, a case where an electronic album is generated by laying out the image data and the text data associated with the image data in pairs of an image box and a text box positioned upon the page will be described. Unless otherwise stated, the processes described hereinafter are realized by the controller 101 of the editing apparatus 100 executing the electronic album generating application program in response to instructions input via the input device 109, the display 110, and so on as a result of user operations. In FIG. 2, first, in step S201, a page size and number of pages are selected through user operations, and in step S202, a template is selected through user operations. The template is defined by a table composed of attribute information required by the layout, and an example of such a template is illustrated in FIG. 3. Various pieces of data regarding frame IDs 301, for identifying the positions of image boxes and text boxes upon the page, number of comment lines 302 that can be input into text boxes, and number of characters per line 303 that can be input into text boxes, are stored in the template. FIG. 4 illustrates an example of a page layout of image boxes and text boxes corresponding to the example of the template illustrated in FIG. 3.

Figure 5:
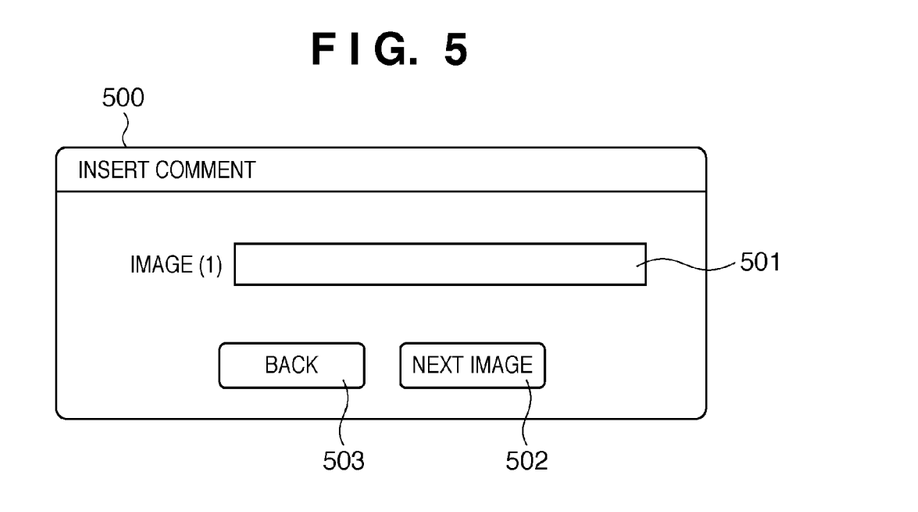
FIG. 5 is a diagram illustrating an example of a text input window according to an embodiment of the invention.

Returning to FIG. 2, in step S203, the user selects the image data to be inserted into the page, and in step S204, inputs text data to be associated with each piece of inserted image data. Here, the text data is input into a text input window 500, an example of which is illustrated in FIG. 5, through user operations. Reference numeral 501 indicates an editable field into which text is input. Reference numeral 502 is a button for moving to a text input window for the next image. Reference numeral 503 is a button for returning to the previous window.

In step S205, combinations of image data and text data are sorted into each page based on the number of pages and template selected in steps S201 and S202. Here, the combinations of image data and text data are, for example, sorted in order across the pages, in an order based on the date/time at which the image data was shot, the order of selection, and the filenames.

Figure 6:
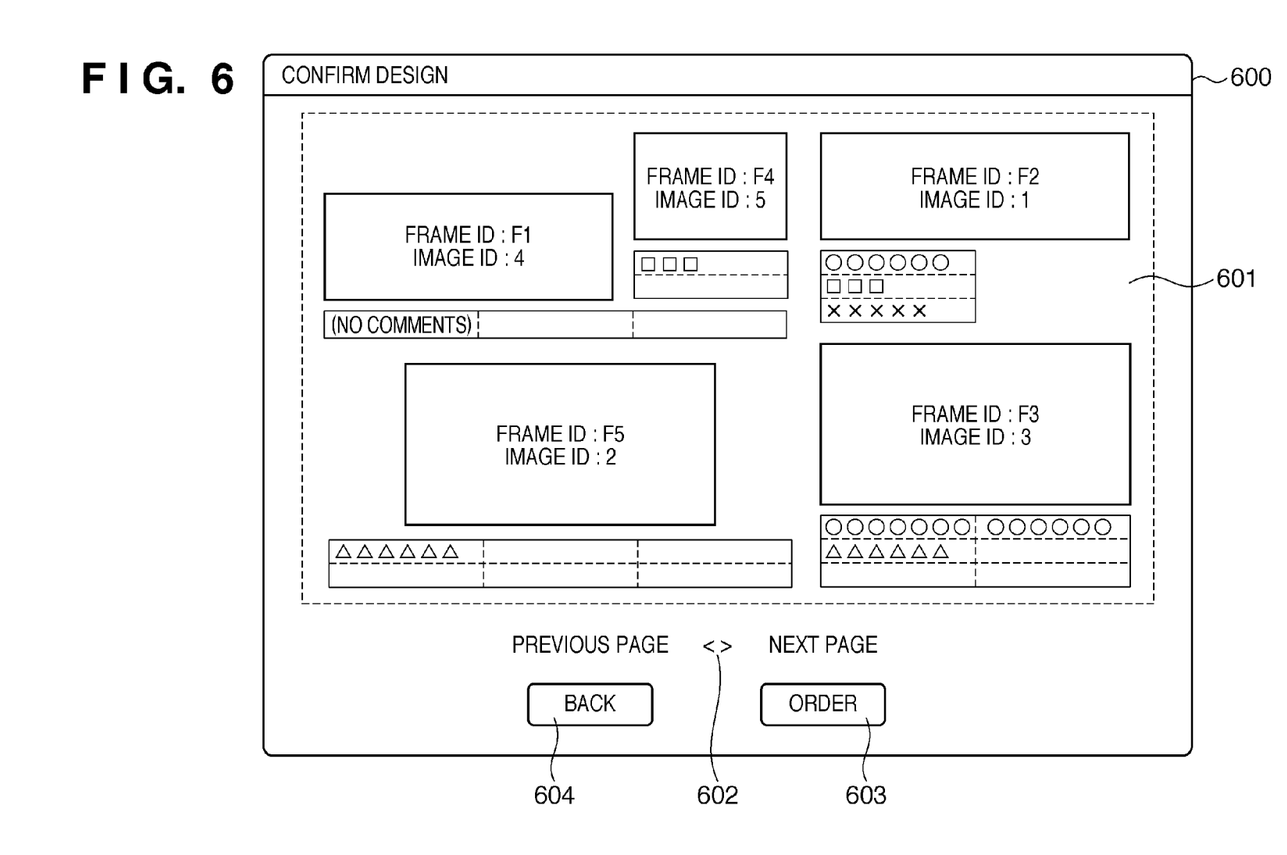
FIG. 6 is a diagram illustrating an example of a design confirmation window according to an embodiment of the invention.

Next, in step S206, the layouts of the combinations of image data and text data upon the pages are determined. In step S207, a design confirmation window 600, an example of which is illustrated in FIG. 6, is displayed, and the user confirms the layout of the image data and text data for each page contained in the electronic album; if revisions are necessary, the process returns to step S206 and the layout is revised. In the design confirmation window 600 shown in FIG. 6, reference numeral 601 indicates the area in which the layout of images and text within the page is to be confirmed. Reference numeral 602 indicates buttons for moving to the previous and next pages in the album. Reference numeral 603 indicates a button for ordering the electronic album to be created as a book. Reference numeral 604 is a button for returning to the previous window. When the order button 603 is clicked, in step S208, the electronic album data in which the layout has been completed as described thus far is sent to the external device via the network line 111.

<Layout Determination Process>

Next, the layout process in step S206 of FIG. 2 will be described with reference to FIG. 7. Here, the template selected in S202 is assumed to correspond to the layout illustrated in FIG. 4. In addition, unless otherwise stated, the processes described hereinafter are realized by the controller 101 of the editing apparatus 100 executing the electronic album generating application program in response to instructions input via the input device 109, the display 110, and so on as a result of user operations.

Figure 7:
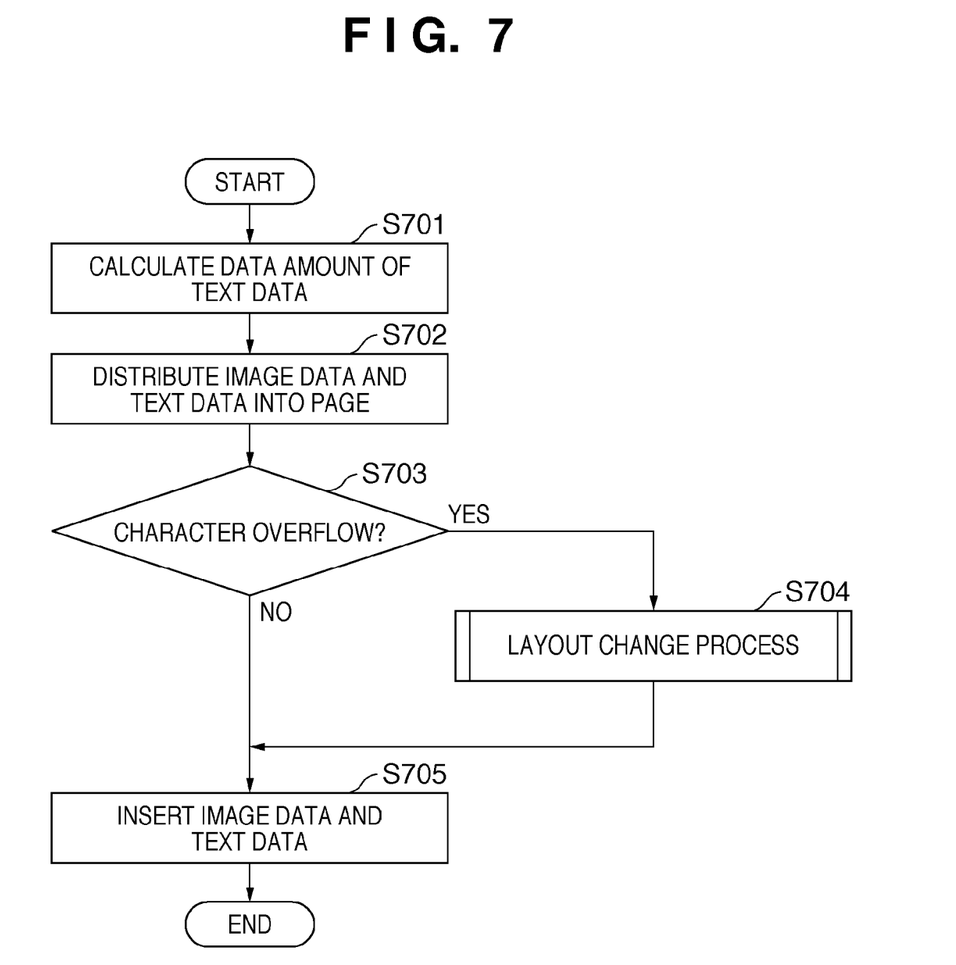
FIG. 7 is a flowchart illustrating the layout determination process in step S206 of FIG. 2.
Figure 8A:
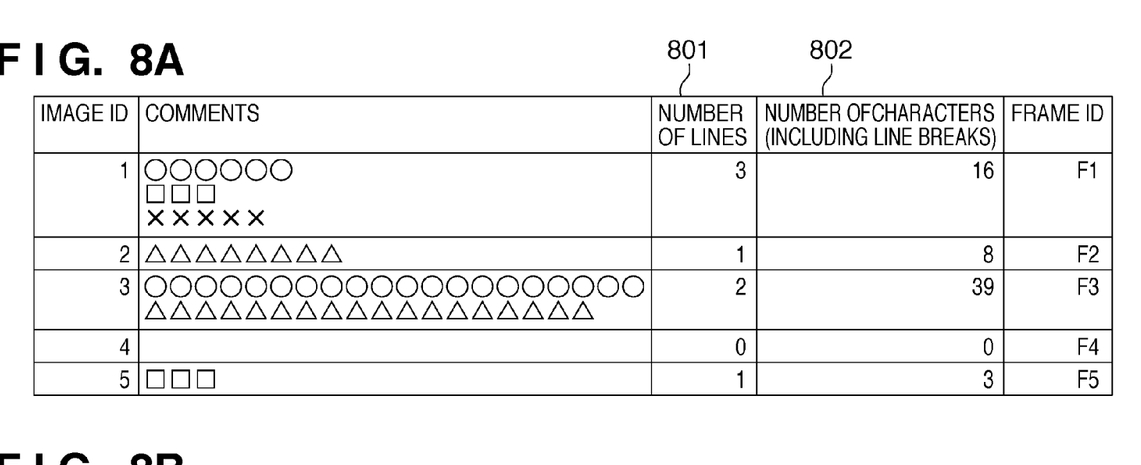
FIGS. 8A and 8B are diagrams illustrating examples of attribute tables changed through a layout change process in step S704 of FIG. 7.

In FIG. 7, in step S701, the amount of the text data input in S204 is calculated, and calculation results for a number of lines 801 and a number of characters 802 are saved as the amounts for each piece of image data (image ID), examples of which are shown in FIG. 8A. In step S702, combinations of image data and text data are distributed into combinations of image boxes and text boxes upon the pages. This distributing method involves distributing upwards from text boxes having lower frame IDs, in accordance with, for example, the order in which the pieces of image data were selected, the order of the file names of the image data, and the order of the date/time at which the pieces of image data were shot. Alternatively, the amounts of the text data as calculated in step S701 are compared with the text data amounts for the frame IDs calculated based on the numbers of comment lines 302 and numbers of characters per line 303 shown in FIG. 3, and the text boxes with higher numbers of lines are distributed in order from text data having a higher number of lines down. At this time, if two instances of text data have the same number of lines, the text box having the greater number of characters is distributed first.

Next, in step S703, the amount of the text data is compared with a limit value for the data amount that can be input into the text box into which that text data has been distributed. When the result of the comparison indicates that the amount of the text data is greater than the limit value of that text box, it is determined that there is a character overflow. When there is no character overflow, in step S705, the image data and text data are inserted at the position of the combination of the text box and image box into which those pieces of data have been distributed in accordance with the attribute information shown in FIG. 8A and based on the template shown in FIG. 4.

However, when there is a character overflow, a layout change process is carried out in step S704, and the process then moves to step S705.

<Layout Change Process>

Figure 9:
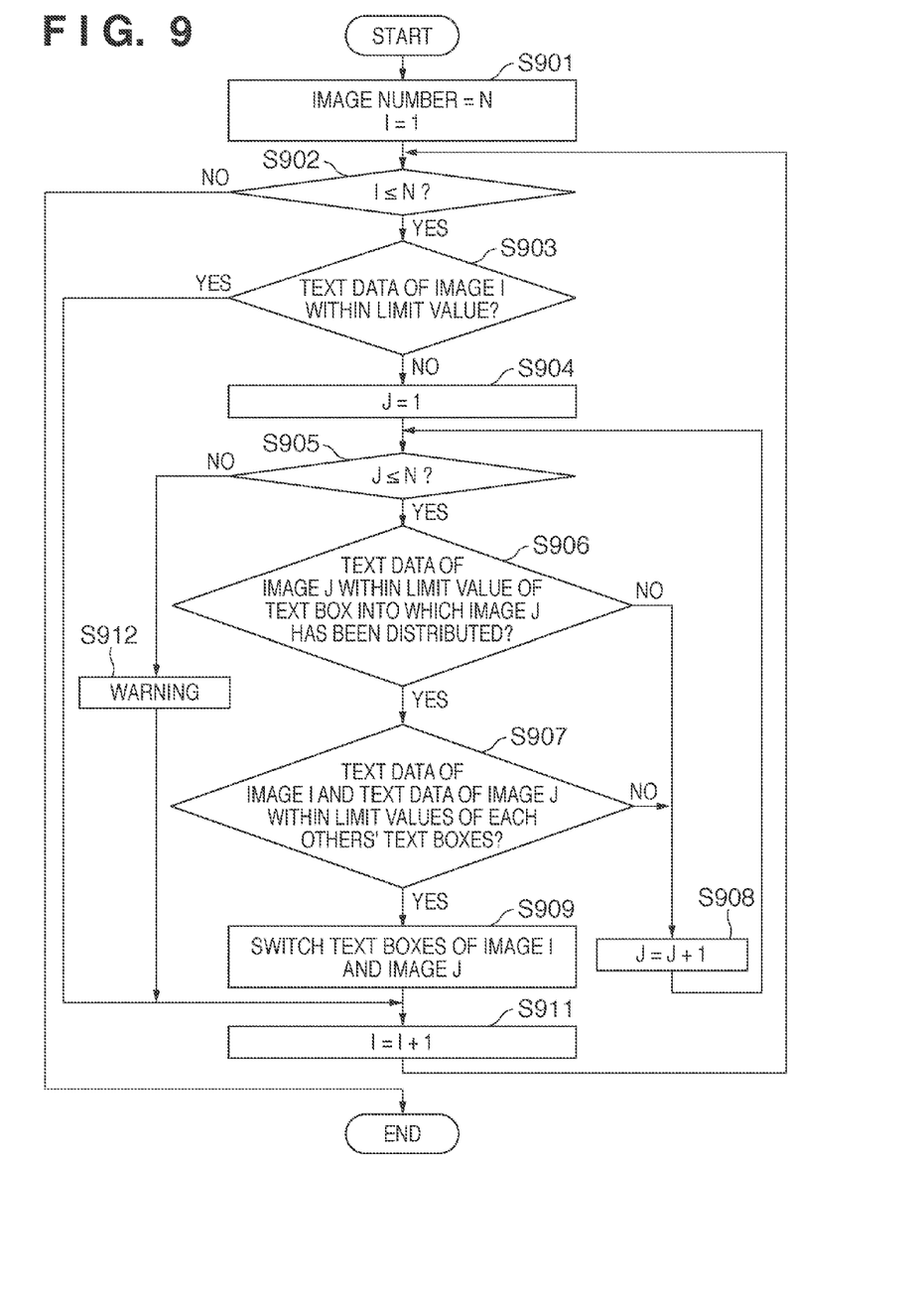
FIG. 9 is a flowchart illustrating the layout change process in step S704 of FIG. 7.

Next, the layout change process in step S704 of FIG. 7 will be described with reference to FIG. 9. As shown in FIG. 8A, the number of characters "39" for the image having an ID of 3 (frame ID=F3) exceeds the number of characters "20" for the frame having an ID of F3 in FIG. 3, and thus it is determined, in step S703, that a character overflow has occurred. As a result, as shown in FIG. 9, the controller 101 first substitutes an image number N for the total number of pieces of image data to be laid out upon the page (S901). In the present embodiment, there are image IDs 1 through 5, and thus N is set to "5". Meanwhile, the controller 101 sets a counter I to "1", as an initial value (S901). Next, the controller 101 determines whether or not there is unprocessed image data (S902). Here, the counter I, which is incremented each time the processing of an image is completed in S911 (discussed later), is compared to the image number N, and it is determined that there is unprocessed image data if the image number N is greater than the counter I. If there is unprocessed image data, it is determined whether the amount of the text data associated with image data (I) is within the limit value of the text box to which the image data (I) has been distributed (S903). If the data amount is within the limit value, the counter is incremented by "1" (S911), and the process returns to step S902. However, if the data amount exceeds the limit value, a counter J is set to "1", as an initial value (S904).

Next, the controller 101 determines whether or not there is unprocessed image data (S905). Here, the counter J, which indicates the number of images for which the amount of the text data exceeds the limit value, is compared to the image number N, and it is determined that there is unprocessed image data if the image number N is greater than the counter J. If there is unprocessed image data, it is determined whether the text data associated with image data (J) is within the limit value of the text box to which the image data (J) has been distributed (S906). If the text data is within the limit value, the determination of S907 is carried out. It is determined whether the amount of the text data associated with the image data (I) is within the limit value of the text box of the image data (J) and whether the amount of the text data associated with the image data (J) is within the limit value of the text box of the image data (I) (S907). As a result of the determination, if both data amounts are within the respective limit values, the text boxes to which the image data (I) and (J) have been distributed are reversed, the attribute information in FIG. 8A is updated (S909), and the process moves to step S911.

Meanwhile, if the data amounts exceed the limit value of the text box in steps S906 and S907, the counter J is incremented (S908), and the process returns to step S905. Meanwhile, if in step S905 there is no unprocessed image data, a warning dialog indicating the there are no text boxes in which the text data associated with the image data (I) will fit is displayed in the screen, and a notification prompting the user to revise the text data is carried out (S912).

Figure 8B:
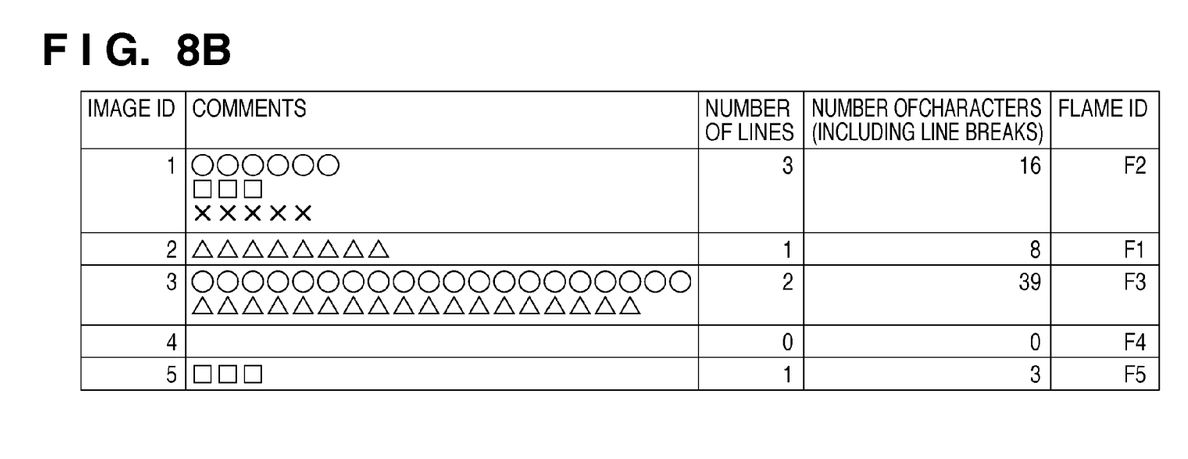

Here, the aforementioned layout change process will be described in detail with reference to FIGS. 8A and 8B. In FIG. 8A, when I=1, the amount of the text data associated with the image having an ID of 1 is three lines and 16 characters. Because the limit value for the data amount of the text box in the frame F1, to which the image data (I) has been distributed, is one line and 30 characters, it is determined that the data amount exceeds the limit value of the text box (S903). Then, likewise, when J=1, it is determined that the text data associated with the image having an ID of 1 will not fit into the text box of the image data (I) (S906), and the counter J is incremented (S908).

Next, when J=2, the amount of the text data associated with the image having an ID of 2 is one line and eight characters, and because the limit value for the data amount of the text box of the frame F2 to which the image having an ID of 2 has been distributed is three lines and 30 characters, it is determined that this text data will fit (S906). Then, it is determined whether or not the respective pieces of text data associated with the image having an ID of 1 and the image having an ID of 2 (J=2) will fit in the respective text boxes to which the image having an ID of 1 and image having an ID of 2 have been distributed (S907). If it determined that the text data will fit, the respective combinations of image boxes and text boxes into which the image having an ID of 1 and image having an ID of 2 have been distributed are switched. The attribute information (frame IDs) is then updated, as shown in FIG. 8B.

Note that the present embodiment describes a case where combinations of image boxes and text boxes are switched based on combinations of image data and text data that are laid out upon the same page. However, the invention is not limited thereto, and combinations of image data and text data that are laid out across multiple pages may be switched as well. At this time, the pages to which the layout change process is to be applied may be made selectable in response to user operations. In this way, the user can carry out the layout change process within only a range of multiple pages he/she desires, thus making it possible to prevent affecting the layout of pages he/she does not intend to be affected. Alternatively, the multiple pages to which the layout change process is to be applied may be automatically selected from among all of the pages based on attribute information of the image data contained within a page, attribute information set for a page, and so on. Through this, the layout change process can be executed for image data, pages, and so on having similar content, categories, or the like.

Meanwhile, in the case where, when the text data is input in step S204 of FIG. 2, the amount of the text data is calculated and that text data exceeds the maximum value of the limit value for the data amount of the multiple text boxes specified in the table of FIG. 3, the warning dialog described in step S912 may be displayed. This makes it possible to prevent text data that will not fit in any of the text boxes from being input, which eliminates the burden on the user of having to redo the text data input operations.

Furthermore, although in the present embodiment, the text data is input in step S204 after a template is selected in step S202, the template may instead be selected after the text data has been input. In this case, several candidates may be extracted from among all of the templates based on the amounts of the pieces of text data that have been input; the user may then be allowed to select a template, or a template may be selected automatically.

Furthermore, the surface area of the area in which a combination of a text box and an image box can be contained may be set to be constant, or in other words, the image box may be reduced in size when the text box is larger, and the image box may be increased in size when the text box is smaller. In this way, the proportion of the multiple combinations of image data and text data is constant upon the page, thus enabling layouts that are balanced upon the page. In this case, if the resolution of the image data is less than a predetermined value when the text data associated with the image data is input in step S204, a message prompting the user to increase the amount of the text data may be displayed. In this way, if the amount of text data increases, the low-resolution image data is inserted into a small image box, and thus an image box with too low a resolution can be prevented from occurring upon the page. Alternatively, people, faces, or the like may be detected from the image data as subjects, and a message prompting the user to reduce the amount of text data may then be displayed if the number of people is greater than a predetermined number. In this way, if the amount of the text data decreases, image data including many people is inserted into a large image box; thus each person is displayed at a large size and is thus more easily identifiable.

Figure 10:
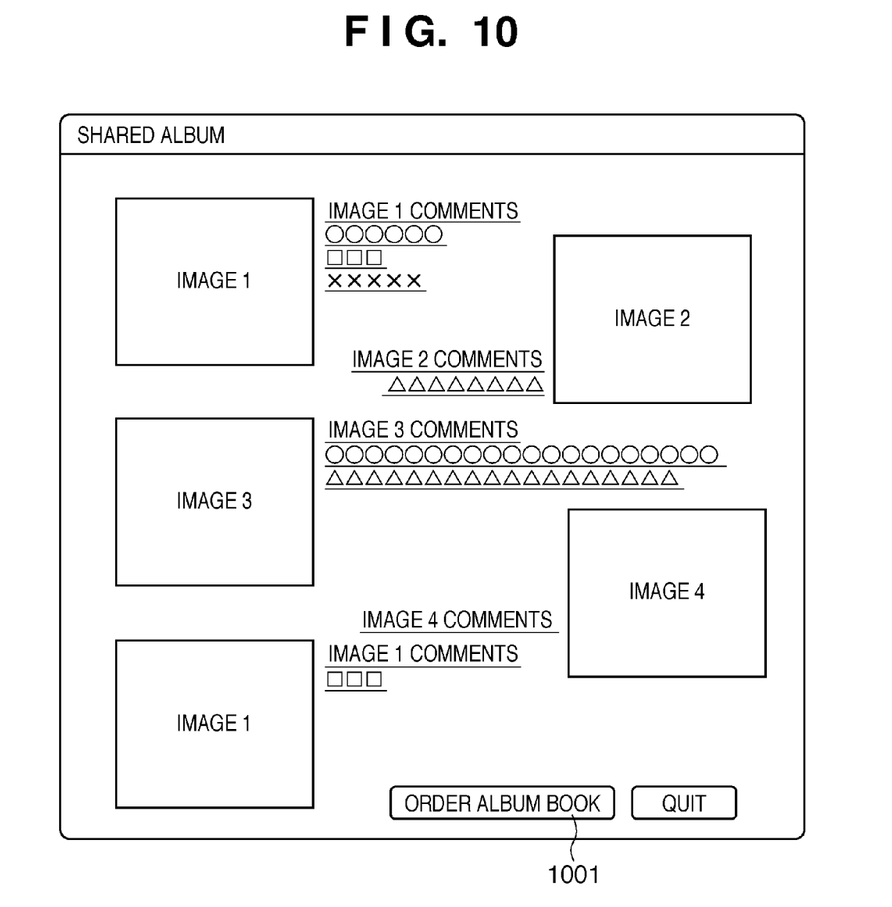
FIG. 10 is a diagram illustrating an example of an online album according to a variation on an embodiment of the invention.

Note also that the present embodiment describes an example in which the text data input is carried out in step S204 after the image data is selected in step S203 of FIG. 2. As opposed to this, image data already associated with text data included in a shared album made public on the web, such as that shown in FIG. 10, may be implemented so as to be downloadable and usable. In this case, when the owner of the shared album presses an order button 1001 for creating the album as a book, an online shop downloads the image data belonging to the shared album and the text data associated therewith in response to the order for album creation. The processes from step S205 on are then executed. Finally, although the text data is depicted as being input through user operations in FIG. 2, predetermined attribute information may be extracted from metadata added to the image files selected in step S203 and used as the text data.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-134295, filed Jun. 3, 2009, which is hereby incorporated by reference herein in its entirety.

What is claimed is:

1. An editing apparatus for laying out image data and text data on a page, comprising:
   a controller; and
   a memory configured to store at least one program executable by the controller, at least one program comprising program code that, when the program is executed by the controller, implements the steps of:
   an image distributing step of distributing a plurality of image data into each of image boxes upon a plurality of pages in an order based on attribute information of the plurality of image data;
   a text distributing step of distributing a plurality of text data associated with each of the plurality of image data into a plurality of text boxes paired with the image boxes, into which the image data is distributed;
   a comparison step of comparing the amount of the text data to an upper limit amount of the text box into which the text data has been distributed;
   a text re-distributing step of, when the result of the comparison indicates that the amount of the text data is greater than the upper limit amount of the text box, re-distributing the text data into another text box, which has been distributed into another text data and is present upon the same page as the text box paired with the image box; and
   an image re-distributing step of, re-distributing the image data into another image box paired with the another text box, into which has been re-distributed the text data associated with the image data,
   wherein the amount of the text data is less than the upper limit amount of the other text box, and the upper limit amount of the text box is greater than the amount of the other text data.

2. The apparatus according to claim 1, wherein the program code further implements:
   a warning step of performing a warning when another other image data and another other text data distributed into the other set of an image box and a text box does not exist.

3. The apparatus according to claim 1, further comprising: wherein the apparatus allows input of the text data, and wherein the program code further implements:
   a comparison step of comparing unit compares the amount of text data input to the upper limit amount of the text box into which the text data has been distributed while the text data is being input; and
   a warning step of performing a warning when the result of the comparison indicates that amount of the input text data is greater than the upper limit amount of the text box.

4. The apparatus according to claim 1, wherein the text data is metadata that has been added to the image data.

5. A method of laying out image data and text data on a page, comprising the steps of:
   distributing a plurality of image data into each of image boxes upon a plurality of pages in an order based on attribute information of the plurality of image data;
   distributing a plurality of text data associated with each of the plurality of image data into a plurality of text boxes paired with the image boxes, into which the image data is distributed;
   comparing the amount of the text data to an upper limit amount of the text box into which the text data has been distributed;
   when the result of the comparison indicates that the amount of the text data is greater than the upper limit amount of the text box, re-distributing the text data into another text box, which has been distributed into another text box and is present upon the same page as the text box paired with the image box;
   re-distributing the image data into another image box paired with the another text box, into which has been re-distributed the text data associated with the image data,
   wherein the amount of the text data is less than the upper limit amount of the other text box, and the upper limit amount of the text box is greater than the amount of the other text data.

6. A non-transitory computer-readable medium with an executable program stored thereon, wherein the program instructs a controller to perform the following steps of:

distributing a plurality of image data into each of image boxes upon a plurality of pages in an order based on attribute information of the plurality of image data;

distributing a plurality of text data associated with each of the plurality of image data into a plurality of text boxes paired with the image boxes, into which the image data is distributed;

comparing the amount of the text data to an upper limit amount of the text box into which the text data has been distributed;

when the result of the comparison indicates that the amount of the text data is greater than the upper limit amount of the text box, re-distributing the text data into another text box, which has been distributed into another text box and is present upon the same page as the text box paired with the image box;

re-distributing the image data into another image box paired with the another text box, into which has been re-distributed the text data associated with the image data, wherein the amount of the text data is less than the upper limit amount of the other text box, and the upper limit amount of the text box is greater than the amount of the other text data.

7. The method according to claim 5, further comprising the step of:

performing a warning when another image data and another text data distributed into the other set of an image box and a text box does not exist.

8. The method according to claim 5, further comprising the steps of:

inputting the text data;

comparing the amount of input text data to the upper limit amount of the text box into which the text data has been distributed while the text data is inputting; and performing a warning when the result of the comparison indicates that amount of the input text data is greater than the upper limit amount of the text box.

9. The method according to claim 5, wherein the text data is metadata that has been added to the image data.

* * * * *